United States Patent [19]
Hefter et al.

[11] Patent Number: 4,935,946
[45] Date of Patent: Jun. 19, 1990

[54] X-RAY DIAGNOSTICS INSTALLATION

[75] Inventors: Peter Hefter; Konrad Kastenmeier, both of Erlangen; Thorsten Miglus, Naila, all of Fed. Rep. of Germany

[73] Assignee: Siemens Aktiengesellschaft, Berlin and Munich, Fed. Rep. of Germany

[21] Appl. No.: 246,685

[22] Filed: Sep. 20, 1988

[30] Foreign Application Priority Data

Sep. 28, 1987 [DE] Fed. Rep. of Germany ....... 3732636

[51] Int. Cl.$^5$ .............................................. H05G 1/64
[52] U.S. Cl. ....................................... 378/99; 378/98; 378/112; 378/157; 358/111
[58] Field of Search .................... 378/98, 99, 111–112, 378/62, 157, 152; 358/111

[56] References Cited

U.S. PATENT DOCUMENTS 4,061,920 12/1977 Möllendorf et al. .................. 378/99
4,517,594 5/1985 Horbaschek .
4,533,947 8/1985 Smith .
4,663,773 5/1987 Haendle et al. .
4,674,108 6/1987 Asahina et al. .

FOREIGN PATENT DOCUMENTS 0087284 8/1983 European Pat. Off. .
2414806 6/1975 Fed. Rep. of Germany .

Primary Examiner—Carolyn E. Fields
Assistant Examiner—David P. Porta
Attorney, Agent, or Firm—Hill, Van Santen, Steadman & Simpson

[57] ABSTRACT

An x-ray diagnostics installation has an x-ray source, an x-ray image intensifier video chain, and a control circuit connected to the output of the video chain which includes a circuit for data reduction which combines a number of image points of the total x-ray image into smaller image regions. A threshold circuit for contour recognition is connected to the output of the reduction circuit, which compares the measured values of the individual image regions to a threshold, and transmits through only those measured signals corresponding to darker regions of the image, and thus corresponding to image regions of relevance.

6 Claims, 2 Drawing Sheets

X-RAY DIAGNOSTICS INSTALLATION

BACKGROUND OF THE INVENTION

1. Field of the Invention

The present invention is directed to an x-ray diagnostics installation of the type wherein the x-ray image is converted through a video chain to a displayable video image.

2. Description of the Prior Art

An x-ray installation is known from German OS 32 25 061, corresponding to U.S. Pat. No. 4,517,594, discloses an x-ray diagnostics installation wherein a portion of the output image from the x-ray image intensifier is coupled through a light distributor onto a detector consisting of a matrix of photosensors. The parallel outputs of the photosensors are connected to a summing amplifier via switches. The output signals of the individual photodetectors can be weighted by variable resistors. The output signal of the summing amplifier is compared, as an actual value signal, to a rated value, and the high voltage generator for the x-ray source is switched and controlled on the basis of the comparison.

A disadvantage of the above installation is the necessity of providing a light distributor. Moreover, it is relatively complex to use a matrix consisting of photosensors, because an amplifier must be allocated to each photosensor. Since the amplifiers require a certain amount of space, the resolution of the image which is achievable is limited, because only a limited number of photosensors can be used within a given area. Additionally, even though variable resistors are used, these resistors, once set, do not change in value, therefore a continuous variation and matching of the weighting cannot be undertaken.

SUMMARY OF THE INVENTION

It is an object of the present invention to provide an x-ray diagnostics installation wherein a finer and thus more precise subdivision of the x-ray image can be achieved, with simultaneous matching of the weighting, without significant additional outlay for expensive components. The above object is achieved in accordance with the principles of the present invention in an x-ray diagnostics installation having a control circuit connected to the output of the video chain which includes a data reduction circuit that combines a plurality of image points of the x-ray image into smaller image regions. A threshold circuit for contour recognition is connected to the output of the reduction circuit, which compares the measured values of the individual image regions to a threshold, and passes only those measured signals which are allocated to darker regions, and which thus correspond to image regions relevant for diagnostics purposes. Such a structure permits modification of the image regions to be made during the acquisition of the actual value signal. A dynamic variation adapted to actual conditions is thus achieved, which supplies the required measured value signal.

A preferred combination of the measured value signals is obtained in an embodiment of the invention including an integration circuit connected to the output of the threshold circuit. The integration circuit calculates a mean value of the relevant regions, and is connected to the supply for the x-ray source to control the supply. Certain image regions may be blanked, for example, by a circular diaphragm or a multi-leaf collimator, and since these regions contain no relevant diagnostic information, these regions can be suppressed in the output image in an embodiment including a control circuit with a masking circuit which identifies the irrelevant image regions which have been blanked, and which is connected to the threshold circuit so as to suppress the measured signals from those irrelevant image regions. The threshold of the threshold circuit can be adapted to established brightness values by a detector circuit connected to the threshold circuit. The detector circuit calculates the mean value of the brightness of the entire relevant image region, and the threshold for the threshold circuit is calculated therefrom. If a multi-leaf collimator is used in the beam path of the x-ray tube, this collimator can also be controlled by the control circuit disclosed herein.

DESCRIPTION OF THE PREFERRED EMBODIMENTS

Figure 1:
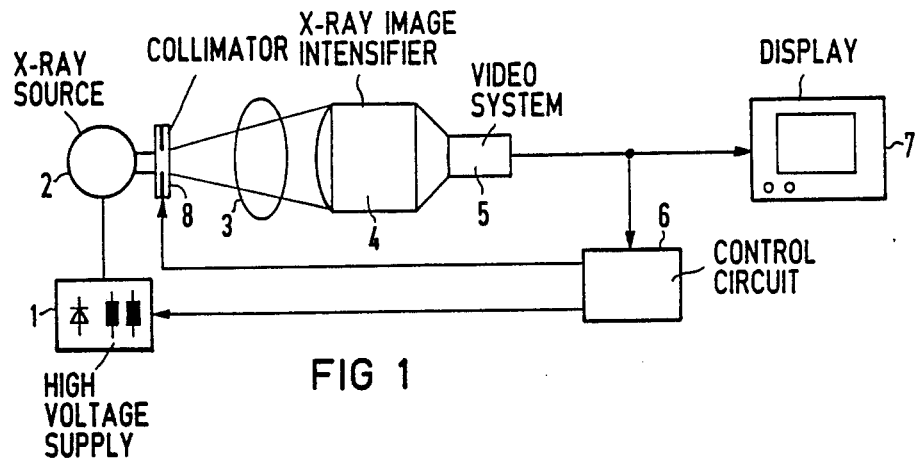
FIG. 1 is a block circuit diagram of an x-ray diagnostics installation constructed in accordance with the principles of the present invention.

As shown in FIG. 1, an x-ray source 2, such as an x-ray tube, is driven by a high voltage supply 1, and emits an x-ray beam which penetrates a patient 3. The x-ray beam attenuated by the patient 3 is incident on the input luminescent screen of an x-ray image intensifier 4, which converts the radiation image into a visible image. A video system 5, which includes a video camera, is coupled to the x-ray image intensifier 4. The video system 5 converts the output image of the x-ray image intensifier 4 into an electrical BAS signal, which is supplied to a control circuit 6, and to a display 7 which visually reproduces the radiation image acquired by the video system 5. The control circuit 6 is connected to the high voltage supply 1, and controls that supply as described below, and is also connected to a multileaf collimator 8 disposed in front of the x-ray source 2 for adjustment of the x-ray beam.

Figure 2:
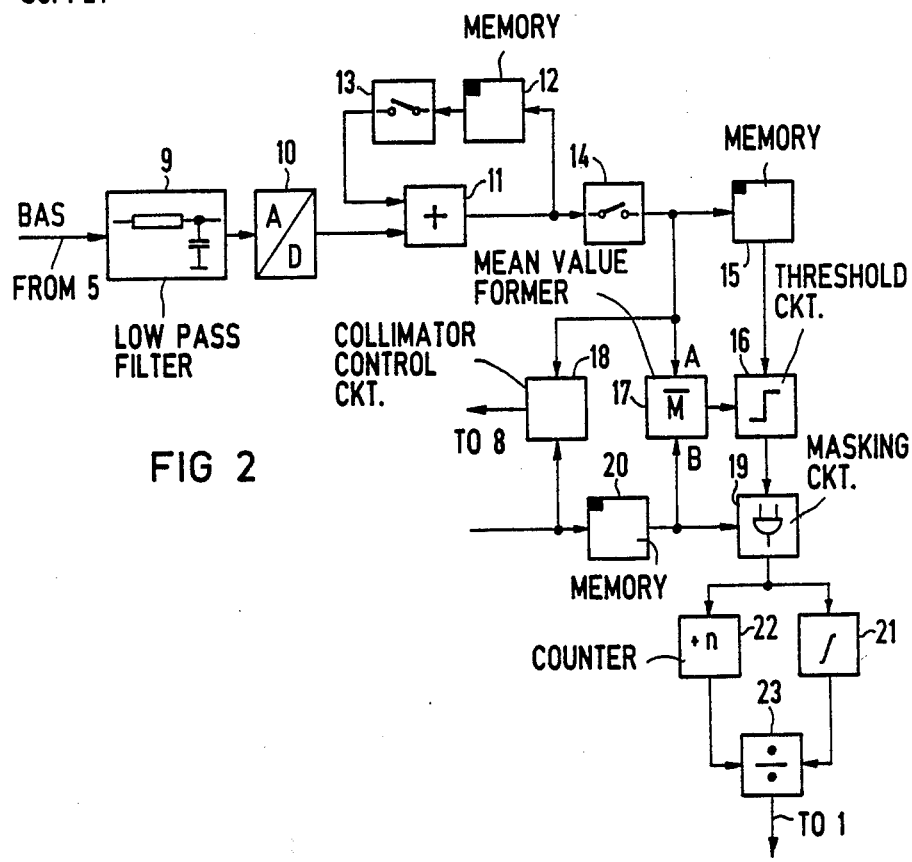
FIG. 2 is a block circuit diagram of the control circuit shown in FIG. 1 constructed in accordance with the principles of the present invention.

The details of the control circuit 6 are shown in FIG. 2. The BAS signal from the video system 5 is supplied through a low-pass filter 9 to an analog-to-digital converter 10. The output of the analog-to-digital converter 10 is connected to a first input of an addition stage 11. The output of the addition stage 11 is fed back to a second input of the addition stage 11 through a memory 12 for intermediate storage of data-reduced brightness values, and through a switch stage 13. Another switch stage 14 is also connected to the addition stage 11. The low pass filter 9, the addition stage 11, the memory 12 and the two switch stages 13 and 14 form a circuit for data reduction, wherein a plurality of image points of the overall x-ray image are combined to form image regions.

Another memory 15 for the reduced values for the image region is connected to the switch stage 14. The output of the memory 15 is connected to an input of a threshold circuit 16. A mean value former 17 is also connected to the switch stage 14, as well as to the threshold circuit 16. The mean value former 17 is a detector circuit for the overall mean value for the brightness of the image signal. A control circuit 18 for the multi-leaf collimator 8 is also connected to the switch stage 14. The control circuit 18 is connected to means for setting the positions of the plates of the multi-leaf collimator 8 as described below.

A masking circuit 19 is connected to the output of the threshold circuit 16, and has an output connected to a memory 20 in which image regions to be blanked are stored. The masking circuit 19 is connected to an integration stage 21, and to a counter 22, which are both connected to a divider stage 23. The output of the divider stage 23 is connected to the high voltage supply 1.

Figure 3:
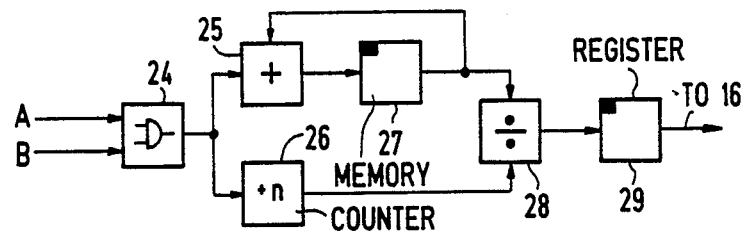
FIG. 3 is a block circuit diagram of the mean value circuit shown in FIG. 2 constructed in accordance with the principles of the present invention.

The mean value former 17 is constructed as shown in FIG. 3. The inputs A and B of the mean value former 17 are connected to a gate circuit 24, having an output connected to another addition stage 25 and another counter 26. The output of the addition stage 25 is fed back to a second input of the addition stage 25 through a memory 27. The outputs of the counter 26 and the memory 27 are connected to another divider stage 28. The output of the divider stage 28 forms the output signal for the mean value former 17 through a register 29, which is supplied to the threshold circuit 16.

In the data reduction circuit, consisting of components 9 through 14, the image from the video system 5, having a resolution roughly of 512 x 512 picture elements, is to be combined to form a matrix or frame of 64 x 64 image regions. This means that sixty-four picture elements, or thirty-two picture elements per field, (the frame consisting of two interlaced fields) yield an image region. For this purpose, the mean value of eight picture elements is calculated in an analog fashion by the low-pass filter 9 within one image line. The converter 10 reads this mean value at the end of each image region within the line, and stores it in a corresponding memory location in the memory 12 through the addition stage 11. Under the control of the switching stage 13, no value is read from the memory 12 and supplied to the addition stage 11 for the first line of an image region, so that only the value supplied by the converter 10 proceeds into the memory 12. For the next three lines within this image region, the switch stage 13 connects the output of the memory 12 to the addition stage 11, so that an addition of the current and the stored values ensues. When these four lines of the image region are combined, the switch stage 14 is closed, and this value is forwarded to the memory 15, so that the mean value of the brightness of the image region of a field is stored therein.

Simultaneously with the entry of the mean values for the individual image regions into the memory 15, these values are combined in the mean value former 17 to form an overall mean value for the complete image. Controlled by the gate circuit 24, the mean values of the relevant image regions are added in the addition stage 25, and the relevant image regions are counted in the counter 26. For this purpose, the gate circuit 24 suppresses those image regions which, for example, correspond to the outer image regions covered by, for example, a circular diaphragm or by the multi-leaf collimator 8. These image regions are contained in the memory 20.

The sum of the mean values in the fourth memory 27 is divided in the divider stage 28 by the counter reading of the counter 26, so that the overall mean value of the field is calculated and entered in the register 29.

This overall mean value is supplied to the threshold circuit 16, from which the threshold for the threshold circuit 16 is calculated. This means that the threshold will change given variation of the overall mean value. The mean values read from the memory 15 are compared to this threshold in the threshold circuit 16. Values above the threshold indicate image regions within which direct (unattenuated) radiation is present. Mean values which are below this threshold indicate radiation regions attenuated by the examination subject.

Those regions which are irrelevant for image interpretation (i.e., diagnostic purposes) are blanked in the masking circuit 19, which follows the threshold circuit 16. Those image regions which, for example, correspond to the circular portion of a circular diaphragm, or to one or both of the plates of a multi-leaf collimator, are identified in the memory 20. The masking circuit 19 may consist of a gate circuit which is switched by the values read from the memory 20.

All measured values of the image regions which are darker than the values fixed by the threshold, and which were not masked by the masking circuit 19, are integrated in the integration stage 21. Simultaneously, the number of summed image regions is counted in the counter 22. Subsequently, the value calculated in the integration stage 21 is divided in the divider stage 23 by the counter reading of the counter 22, so that a mean value is obtained which is used as the actual value for the known voltage control circuit in the high voltage supply 1.

Additionally, the reading of the counter 22 can be used as a measure for the size of the transirradiated subject. The measured value in the integration stage 21 can serve for calculation of the x-ray dose incident on the subject.

Figure 4:
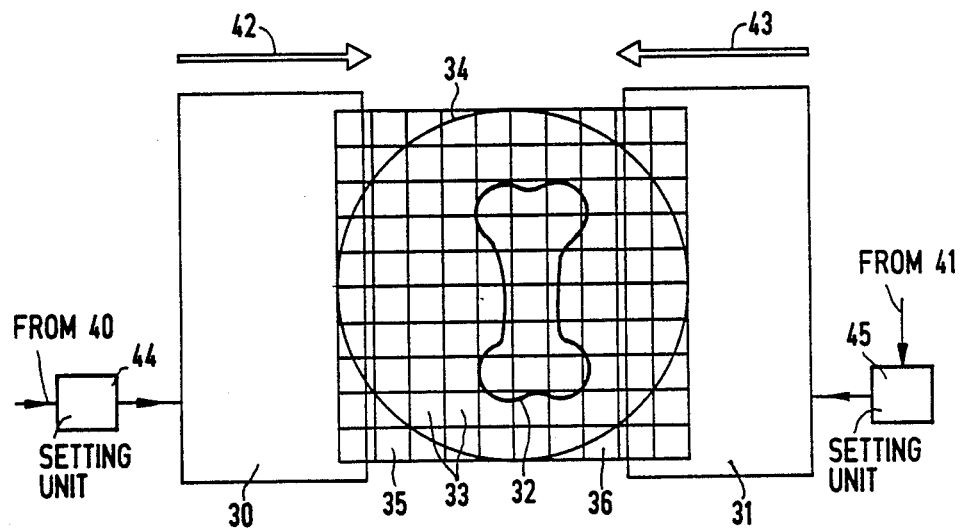
FIG. 4 is a schematic plane view of a multi-leaf collimator used in the x-ray diagnostics installation shown in FIG. 1 and controlled in accordance with the principles of the present invention.

Automatic control of the multi-leaf collimator 8 will be explained in greater detail with reference to FIGS. 4 and 5 on the basis of a simple multi-leaf collimator having two plates or lamellae 30 and 31. An x-ray image of a subject 32, for example a bone, is shown in FIG. 4. A portion of the image is covered by the lamellae 30 and 31. The image is divided into a plurality of individual image regions. The circle 34 identifies the edge of the visible image, i.e., a circular blanking which is standard in x-ray technology. The image regions relative to the measured value acquisition for controlling position of the lamellae 30 and 31 are in columns 35 and 36 disposed immediately in front of the respective lamellae 30 and 31.

Figure 5:
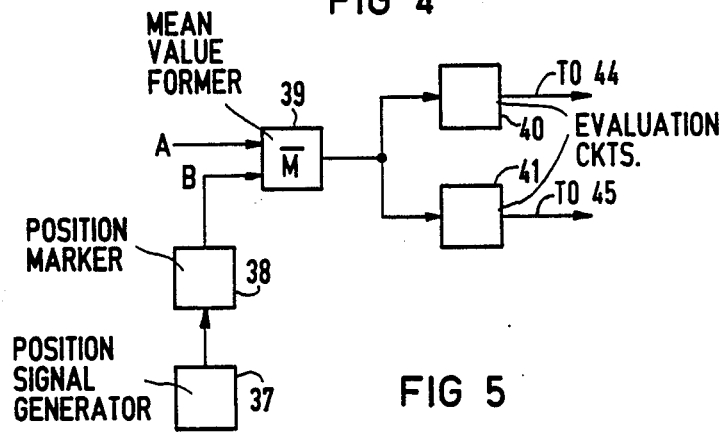
FIG. 5 is a block circuit diagram for a control circuit for the multi-leaf collimator shown in FIG. 4.

The control circuit for position the lamellae 30 and 31 may be constructed as shown in FIG. 5. A position signal generator 37 supplies a signal corresponding to the positions of the lamellae 30 and 31 to a position marker 38, which identifies the complete image regions which lie in front of the lamellae 30 and 31. These image regions correspond to the regions in the columns 35 and 36. The output signal of the position marker 38 is supplied as a control signal to a mean value former 39, which may be constructed as shown in FIG. 3. The mean values of the individual regions which are present at the switch stage 14 are supplied to the second input of the mean value former 39. The mean value former 39 separately forms the mean values for the columns 35 and 36 from the image regions situated in those columns 35 and 36. Respective evaluation circuits 40 and 41 are connected to the output of the mean value former 39. The evaluation circuit 40 is supplied with the mean value allocated to the column 35, and the evaluation circuit 41 is supplied with the mean value allocated to the column 36. On the basis of these mean values, the evaluation circuits 40 and 41 recognize whether a subject is situated in the respective image regions of the columns 35 and 36, or whether unattenuated radiation is present in those image regions.

In the example shown in FIG. 4, no portion of the subject 32 is situated within the column 35, therefore the evaluation circuit 40 supplies a control signal to a setting unit 45 which advances the lamella 30 toward the subject 32 in the direction of the arrow 42. The position signal generator 37 then marks the next column within which the mean value is again formed. This procedure is repeated until the lamella 30 is situated in a position similar to that of the lamella 31, i.e., covering a column which is adjacent to the last column which contains attenuated radiation.

In the embodiment of FIG. 4, the evaluation circuit 41 has recognized that a portion of the subject 32 is situated in the column 36. The evaluation circuit 41 has thus driven the setting unit 45 for the lamella 31 so that the lamella 31 has been moved toward the column 36 in the direction of the arrow 43 until residing adjacent the column 36. It is thus assured that the desired subject 32 is completely reproduced, but undesired (irrelevant) image regions corresponding to unattenuated radiation are blanked.

Using this apparatus, a measured value is obtained which takes the entire relevant image content into consideration. As a result, the region of primary resolution is always matched to the subject with every video field, so that it always contains the subject. Simultaneously, automatic control of the multi-leaf collimator 8 can be undertaken.

Although modifications and changes may be suggested by those skilled in the art it is the intention of the inventors to embody within the patent warranted hereon all changes and modifications as reasonably and properly come within the scope of their contribution to the art.

We claimas our invention:

1. An x-ray diagnostic installation for examining a subject comprising:
    means for generating an x-ray beam in which said subject is disposed;
    means for generating an x-ray image of said subject including radiation attenuated by said subject and unattenuated radiation, said x-ray image consisting of a plurality of image points;
    means for generating a video signal corresponding to said x-ray image;
    means for generating a visual display of said x-ray image from said video signal; and
    means for generating a control signal for controlling said means for generating an x-ray beam including means for combining said plurality of image points to form a plurality of image regions, each image region having a brightness value, and means for determining whether an image region will be permitted to contribute to said control signal by comparing said brightness value of said image regions to a brightness threshold which will be exceeded if an image region includes no points corresponding to radiation attenuated by the examination subject, so that only image regions within said x-ray image containing said radiation attenuated by said subject contribute to and are used to generate said control signal and said control signal thereby has no contribution from image regions having a brightness value which exceeds said threshold.

2. A x-ray diagnostics installation as claimed in claim 1, wherein said means for generating a control signal further includes means for integrating said brightness values to obtain a mean value for each of said image regions and wherein said means for determining includes means for comparing said mean value to said brightness threshold.

3. An x-ray diagnostics installation as claimed in claim 2, wherein said means for generating an x-ray beam includes a high voltage supply, and wherein said means for integrating has an output for supplying said signal for controlling said means for generating an x-ray beam to said high voltage supply.

4. An x-ray diagnostics installation as claimed in claim 1, wherein said means for generating a control signal further includes masking means for identifying irrelevant image regions within said x-ray image and for blanking said irrelevant image regions from said signal for controlling said means for generating an x-ray beam.

5. An x-ray diagnostics installation as claimed in claim 1, further comprising means for calculating the mean value of the brightness of the entirety of said x-ray image and for calculating said threshold of said means for determining from said mean value.

6. An x-ray diagnostics installation as claimed in claim 1, further comprising:
    a collimator disposed between said means for generating an x-ray beam and said subject, said collimator having movable plates to adjust the size of said x-ray beam,
    and wherein said means for generating a control signal includes means for generating a signal for positioning said plates of said collimator.

* * * * *